INVENTORS
WILLIAM C. THOMS
FRANSISCUS C. BAKERMANS
RONALD B. BARNES

INVENTORS
WILLIAM C. THOMS
FRANSISCUS C. BAKERMANS
RONALD B. BARNES
BY
ATTORNEYS

United States Patent Office 3,561,114
Patented Feb. 9, 1971

3,561,114
BOBBIN LUGGER AND METHOD
William C. Thoms, New Cumberland, Fransiscus C. Bakermans, Harrisburg, and Ronald B. Barnes, Camp Hill, Pa., assignors to Berg Electronics, Inc., New Cumberland, Pa., a corporation of Pennsylvania
Filed Sept. 18, 1968, Ser. No. 760,544
Int. Cl. H01r 9/00; H05k 13/04
U.S. Cl. 29—630                             28 Claims

ABSTRACT OF THE DISCLOSURE

Apparatus and method for applying terminal lugs to a bobbin wherein the bobbin is positioned on an indexing mandrel and the mandrel is intermittently moved along a path to bring the bobbin adjacent a lug applicator where lugs are applied to the top of the bobbin. Further indexing of the mandrel along the path positions the bobbin adjacent a turn station where the bottom is removed from the mandrel, positioned on a pin, rotated through 180° about its axis, and repositioned on the indexing mandrel with the lugs positioned on the bottom of the bobbin. Continued indexing of the mandrel positions the bobbin adjacent a second lug applicator which applies lugs to the unlugged top of the bobbin. Further indexing of the mandrel positions the bobbin at a bending station where the lugs on both the top and the bottom of the bobbin are accurately bent to a desired configuration.

---

In the electronics industry plastic bobbins with metal lugs attached for establishing electrical connections are used as coil forms. The lugs may be of the type adapted for attachment to circuit boards or may be of the type to which circuit leads are directly soldered. The lead wires for the coil wound on the bobbin are also attached to the lugs, usually by a solder joint.

Heretofore application of the terminal lugs to the plastic bobbins has raised a number of problems. The lugs and bobbins are relatively small so that it is difficult and unduly expensive to manually insert the lugs into the bobbins. Machines for automatically inserting the lugs in the bobbins have been proposed. However, such machines are slow in operation and are relatively unreliable.

Because the technology requires that the lugs in the bobbins be quite accurately located in order to meet the requirements of subsequent manufacturing processes, it is necessary that a bobbin lugger guarantee accurate location of all lugs attached to the bobbin. In some applications twelve lugs are attached to a single bobbin measuring ½" x ½" x ¾". In the case of a bobbin which is to be attached to a circuit board, the lug portions which will extend through holes in the circuit board must be accurately positioned on the bobbin within a few thousandths of an inch in order to permit ready mounting of the bobbin on the board. If one lug is improperly positioned, additional labor is required to manually reposition the lug and mount the bobbin on the board. It is also essential that the bobbin lug be accurately located to facilitate attachment of the coil leads to the lug.

The invention relates to an improved bobbin lugger and method where the bobbin is automatically mounted on an indexing mandrel which intermittently moves the bobbin along a path past a number of operating stations. At the first station the bobbin is removed from the indexing mandrel, is positioned on a work mandrel, and lugs are applied to the top side of the bobbin. The bobbin is then repositioned on the indexing mandrel and indexed to a turn station where it is removed from the mandrel and positioned on a turn pin. The pin is rotated 180° to locate the side of the bobbin free of lugs on the top of the bobbin, following which the bobbin is repositioned on the indexing mandrel. Further indexing of the mandrel positions the bobbin adjacent the second lugging station, which is identical to the first lugging station, where lugs are applied to the top of the bobbin.

Subsequent indexing of the mandrel brings the bobbin to a bending station where both ends of the lugs on the bobbin are accurately positioned to facilitate subsequent operations. The wire wrap portions of the lugs are accurately bent so that they project away from the bobbin in position to receive leads from the wire coil which will be wound upon the bobbin. Following the bending of the lugs, the bobbin is automatically ejected from the indexing mandrel.

The invention is reliable and high speed in operation, and thus represents a marked improvement over prior bobbin luggers. The necessity for manually loading bobbins is eliminated. Positive, repeatable operation of the various stations of the bobbin lugger is assured by a mechanical cam-operated drive so that it is possible to time the operation of various stations with precision. The positive operation of the bobbin lugger permits exact duplication of the timing and sequence of operations with the result that each bobbin is lugged in exactly the same way with the lugs located precisely. The mechanical drive permits higher operating speeds than conventional pneumatic dependent drive systems.

A further improvement of the invention results from the use of two identical lug applicators separated by a turn station. The turn station rotates the bobbin about its axis, following which it is repositioned on the indexing mandrel so that the side of the bobbin head free of lugs is presented to the second applicator which secures lugs thereto in the same way as the first applicator secured lugs to the opposite side of the bobbin head.

By removing the bobbin from the indexing mandrel, rotating it, and repositioning it on the mandrel it is possible to provide identical lug applicators for attaching lugs to the bobbin head. The bobbin lugger design is simplified since each of these applicators is actuated at the same time. In the case of the bobbin lugger disclosed herein, both applicators are identical and may be used to attach one to six lugs to each side of the bobbin.

By lugging the opposite sides of the bobbin at different times, the speed of operation and reliability are improved. In conventional bobbin luggers all of the lugs are attached on the bobbin at one station. This necessitates a complicated, unreliable, and relatively slow apparatus. Additionally, modification of the identical lug applicators is simplified since it is not necessary to provide different modifications for each applicator.

Other objects and features of the invention will become apparent as the description proceeds, especially when taken in conjunction with the accompanying drawings illustrating a preferred embodiment of the invention, wherein.

DESCRIPTION OF THE BOBBIN LUGGER

Bobbin lugger 10 includes a plate 12 suitably supported by legs (not shown). A continuous indexing chain 14 is mounted on plate 12 on four sprockets 16 and 17 so that a portion of the chain is located above the upper face of plate 12 and extends along the length of the lugger 10. Sprockets 16 and 17 are journaled in suitable supports secured to the plate 12. A plurality of bobbin indexing mandrels 18 are secured to chain 14 at regularly spaced intervals therealong. The portion of the chain 14 above the table 12 runs in a segmented prelubricated chain guide 20 which assures proper orientation of the chain and indexing mandrels during movement of bobbins past the work stations.

Spaced along chain 14 are a number of work stations which perform operations on each bobbin. The chain is intermittently indexed past the stations in the direction of arrow 22 shown in FIG. 2. Bobbin loader 24 automatically mounts a bobbin on the adjacent mandrel 18. With successive indexing of the chain the bobbin is brought adjacent to lug applicator 26 which attaches a plurality of lugs to one side of the bobbin. Further indexing of the bobbin brings it adjacent turn station 28 which rotates the bobbin 180° with respect to the indexing mandrel so that with further indexing the other side of the bobbin is presented for lugging by lug applicator 30. Applicators 26 and 30 insert lugs into the bobbins with the lugs oriented parallel to the axis of the bobbin indexing mandrel. Bending station 32 progressively bends the inner portions of the lugs inserted in the bobbins to a desired configuration. An ejector 34 is provided to automatically remove the lugged bobbins from the mandrels 18 at the left-hand end of the applicator as viewed in FIG. 1.

Work stations 24, 26, 28, 30 and 32 are located on the mandrel side of chain 14 and are associated with bobbin locators 36, 38, 40 and 42 which are used to hold or move the bobbins relative to the mandrels 18.

Drive shafts 46 and 48 are mounted to the bottom of table 12 in bearings 50 and carry cams 52, 54, 56, 58, 60, 62, 64, 66, 68, 70, 72 and 76 which are used to actuate the various work stations and bobbin locators during the 360° cycle of operation of lugger 10. Cams 68 and 70 raise and lower a punch unit shown in part in FIG. 20. Cam 72 located at the left-hand end of shaft 46 operates periodic chain drive 74 illustrated in FIGS. 4 and 5. Cam 76 on shaft 48 operates a chain indexing finger 78 used to accurately position the chain following indexing by drive 74.

Figure 3:
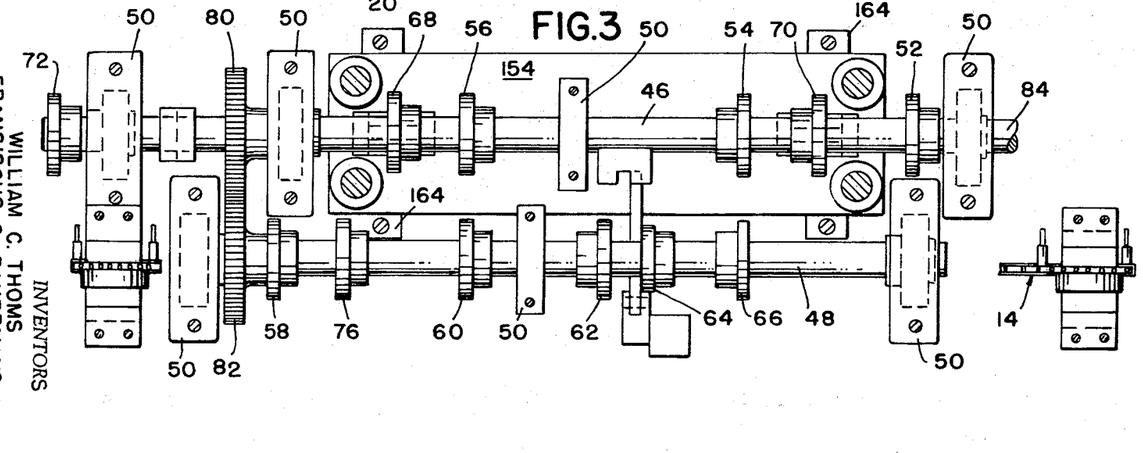
FIG. 3 is a sectional view partially broken away taken along line 3—3 of FIG. 2.

Shafts 46 and 48 are geared together by identical gears 80 and 82 illustrated in FIG. 3 so that each shaft rotates at the same speed. End 84 of shaft 46 is connected to a drive motor through a drive assembly (not shown). The drive motor rotates shaft 46 in a counterclockwise direction and shaft 48 in a clockwise direction when these shafts are viewed from the left-hand end of the applicator.

Figure 4:
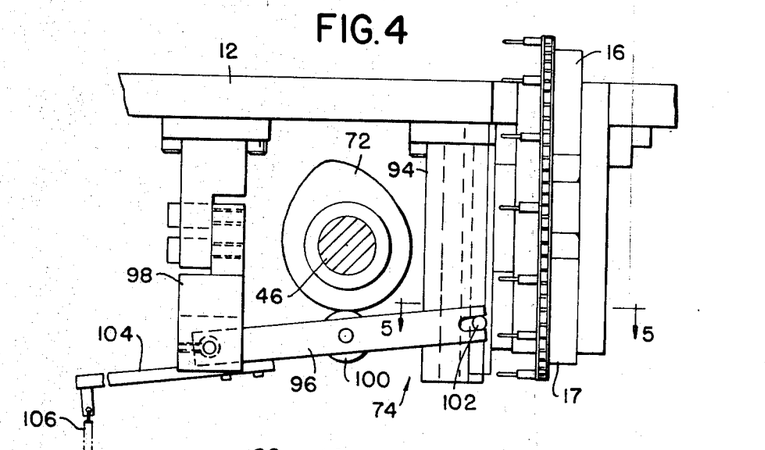
FIG. 4 is a view taken in the direction of arrow 4 in FIG. 2.
Figures 5, 6:
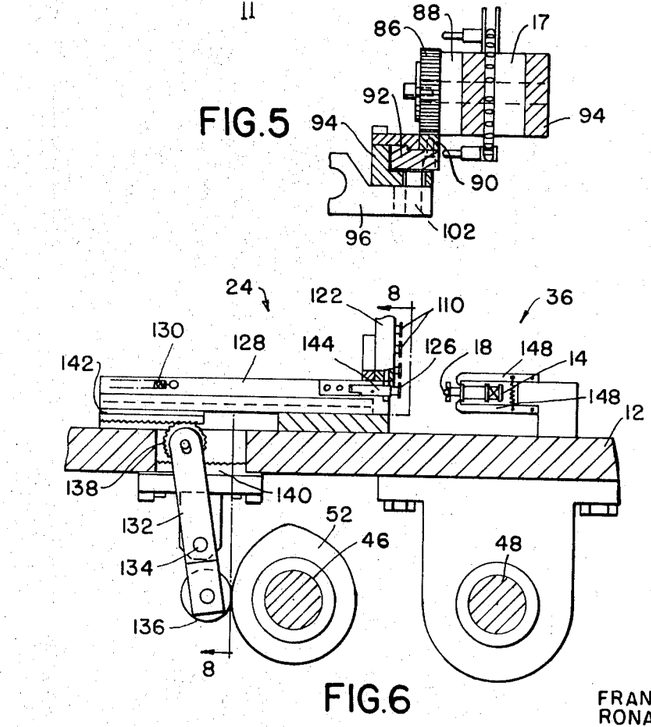
FIG. 5 is a view taken along section line 5—5 of FIG. 4.
FIG. 6 is a view of the bobbin loading mechanism taken along section 6—6 of FIG. 1.
Figure 7:
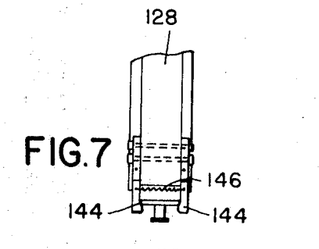
FIG. 7 is a top view of a portion of the bobbin loading mechanism illustrated in FIG. 6.
Figure 8:
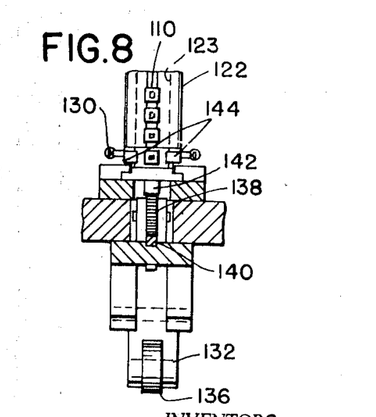
FIG. 8 is a view taken along section line 8—8 of FIG. 6.

As illustrated in FIGS. 4 and 5, chain drive 74 includes a pinion gear 86 which is mounted coaxially on the shaft of sprocket 17 and is connected thereto through a one-way clutch 88. Rack 90 engages pinion 86 and is secured to vertically reciprocable slide 92. The slide is confined in a housing 94 mounted on the bottom of plate 12. Cam bar 96 is pivotally mounted on a fixed support 98 and carries a rotatable cam follower 100. The free end of bar 96 is fitted around pin 102 which is secured to slide 92 and projects outwardly of housing 94 through a slot. Bar 96 is biased toward cam 72 by extension 104 and spring 106 so that follower 100 is maintained in engagement with the cam. Clutch 88 engages to join sprocket 17 to pinion 86 during rotation thereof in response to downward movement of the rack 90 and slide 92 and frees the sprocket from the pinion during upward movement of the rack and slide.

During operation of the bobbin lugger 10, shaft 46 rotates to periodically bring the lobe of cam 72 into engagement with follower 100. As the follower rides up the lobe of the cam, bar 96 is pivoted relative to support 98 and rack 90 is moved down to rotate pinion 86 and sprocket 17. The rotation of the sprocket 17 is such as to move indexing chain 14 and the bobbin indexing mandrels 18 thereon so that each mandrel is located in the prior position of the preceding mandrel. Continued rotation of shaft 46 raises the rack and rotates pinion 86 in the opposite direction. Clutch 88 frees the pinion from sprocket 17 during such rotation. Operation of the chain drive 74 moves indexing mandrels 18 successively past the various work stations. The chain drive indexes the chain only when follower 100 engages the rise of the lobe on cam 72.

Figure 21:
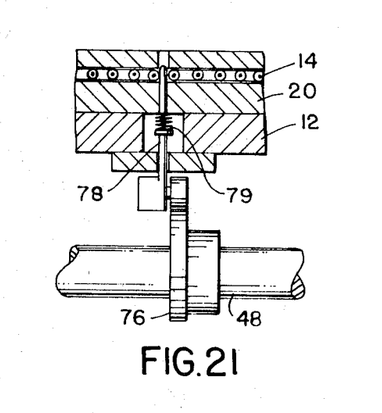
FIG. 21 is a sectional view taken along line 21—21 of FIG. 1.
Figure 25:
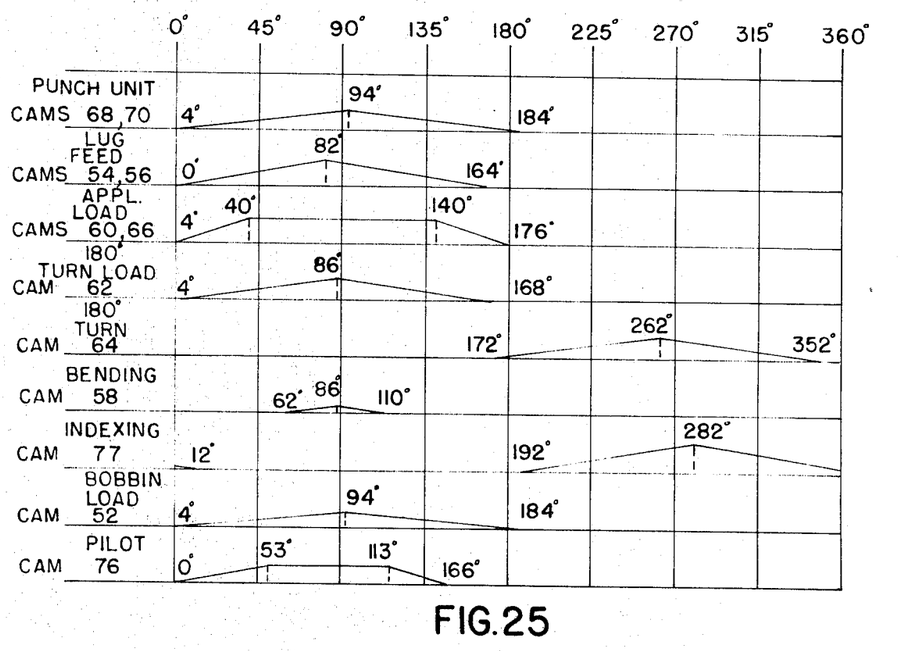
FIG. 25 is a chart illustrating operation of the cams used in the bobbin lugger during one full 360° cycle of operation.

Drive 74 operates to index the mandrels on chain 14 approximately relative to the work stations. Accurate indexing of the chain is accomplished through indexing finger 78 shown in FIG. 21. As illustrated in chart 25, the indexing finger 78 is extended by cam 76 and fits between adjacent links of chain 14 to accurately locate the indexing mandrels during the time when the chain is at rest. Accurate positioning of the mandrels 18 is assured since indexing finger 78 is extended to position the chain 14 once in every cycle of operation of the bobbin lugger 10. Spring 79 returns finger 78 from between the chain links after accurate locating is accomplished.

Figures 16, 23:
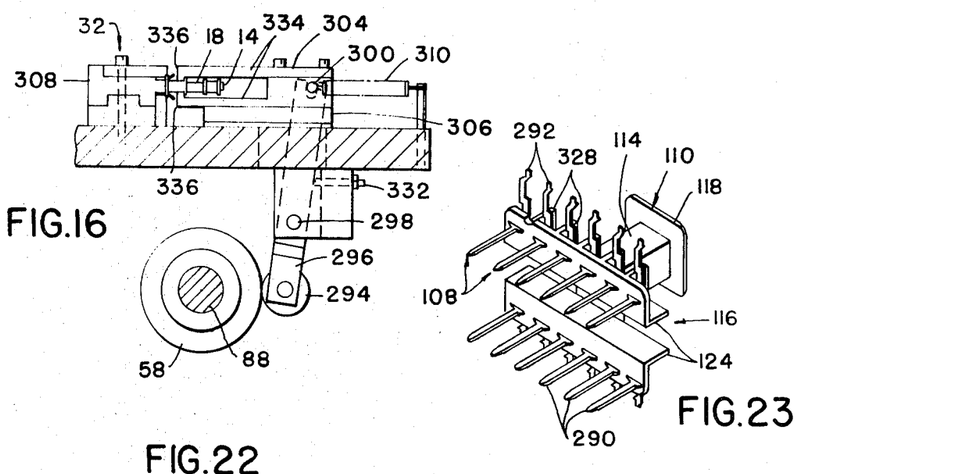
FIGS. 23 and 24 are prospective views of bobbins with lugs attached by operation of the invention.

The bobbin lugger 10 is used to insert a number of metal lugs 108 in slots formed in plastic bobbins 110. See FIG. 23. The lugs are supplied to the lugger in the form of a chain 112 illustrated in FIG. 22. After insertion of the lugs into slots provided in bobbin 110, the inner portions are bent to project away from the bobbin. Bobbin 110 includes a central hub portion 114 with a relatively large head 116 at one end thereof and a smaller head 118 at the other end thereof. A square central bore 120 extends through portion 114 so that the bobbins may be mounted on the square head portions 121 of mandrels 18 which project toward the back of the lugger 10. The mandrels 18 are secured on chain 14 to prevent axial rotation of the bobbins following mounting on the portions 121.

Figure 1:
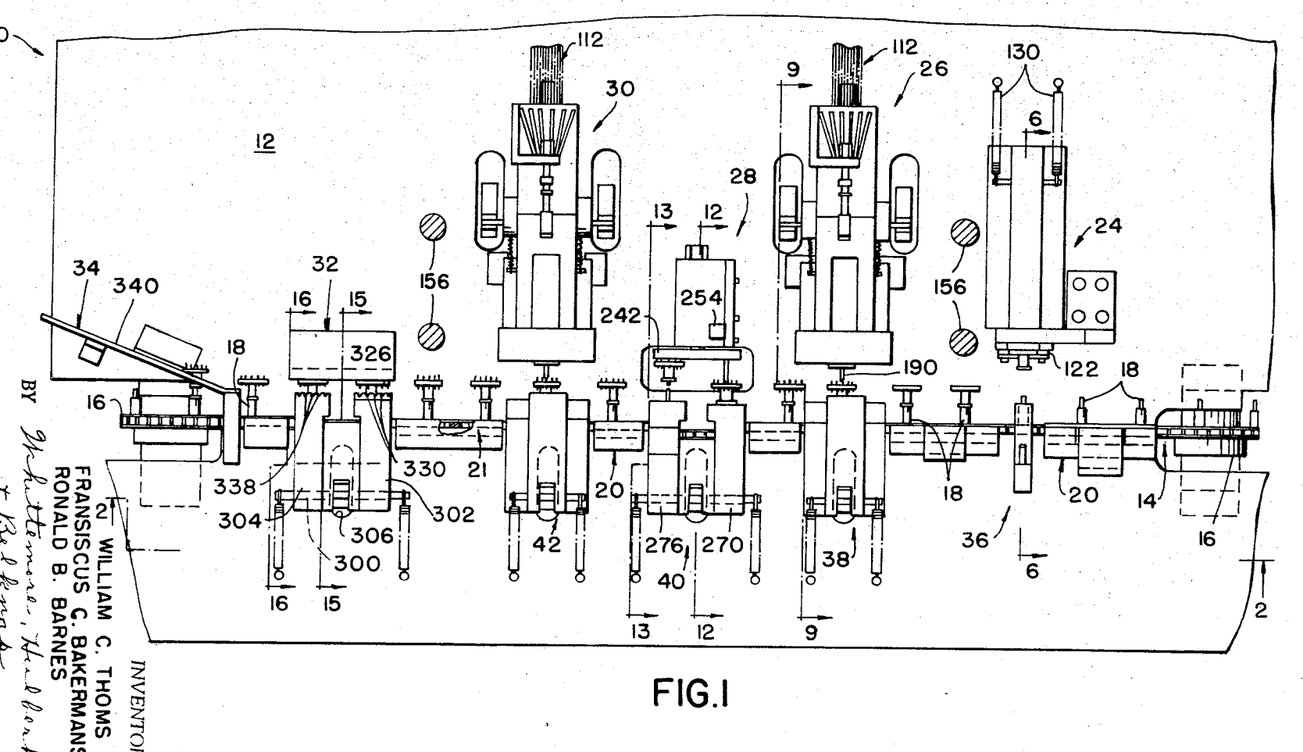
FIG. 1 is a partially broken away top view of a bobbin lugger according to the invention.
Figure 2:
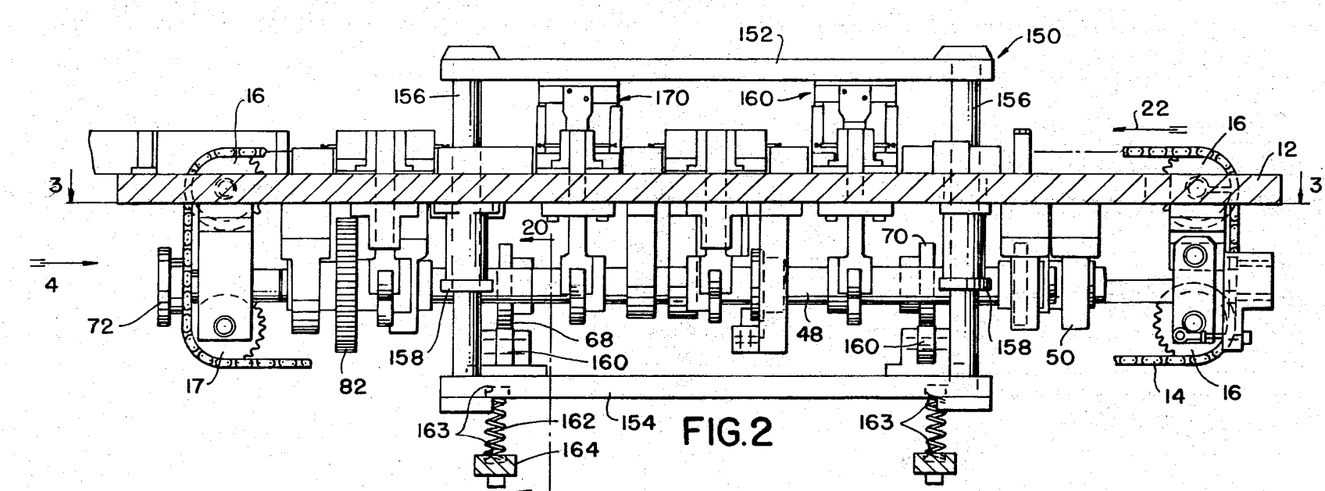
FIG. 2 is a sectional view taken along line 2—2 of FIG. 1.

Bobbin loader 24 includes a magazine bobbin supply 122 which extends up from plate 12. A plurality of bobbins 110 are loaded in a supply 122 by fitting bobbin heads 116 in confining slot 123 with the head portions 124 oriented horizontally. As illustrated in FIGS. 1 and 6, bobbin central portions 114 project outwardly of magazine supply 122 toward chain 14. The bobbins are loosely confined in magazine supply 122 so they fall to the bottom of slot 123 with the lowermost bobbin 126 (see FIG. 6)

located in axial alignment with the adjacent mandrel 18.

Bobbin 126 is moved from magazine supply 122 toward the mandrel by means of a bobbin slide 128 which is mounted on plate 12 for reciprocation toward and away from the adjacent indexing mandrel 18. Slide 128 is biased away from the mandrel by springs 130. Movement of the slide is controlled by cam 52 mounted on shaft 46. Cam yoke 132 is pivotally mounted at 134 on a support secured to the bottom of plate 12. Cam follower 136 on the lower end of yoke 132 is held in engagement with the surface of cam 52 by springs 130. A pinion gear 138 is loosely journaled in slots in the upper arms of yoke 132 and engages rack 140 secured to plate 12 and rack 142 mounted on slide 128.

Gripping fingers 144 are rotatably mounted on the lead end of slide 128. Spring 146 biases fingers 144 toward each other. When the bobbin loader is at rest, slide 128 is positioned as shown in FIG. 6 with fingers 144 surrounding head 116 of the lowermost bobbin 126 in the magazine. As follower 136 rides up on the lobe of cam 52, the slide is extended and bobbin 126 is moved toward the adjacent mandrel 18. Fingers 144 hold the bobbin during movement from the magazine. Full extension of slide 128 positions bobbin 126 on the mandrel with the square mandrel head 121 fitted in bore 120. When the bobbin is fully seated on the mandrel, head 118 thereof is locked behind latch fingers 148 to prevent removal of the bobbin from the mandrel during retraction of slide 128. Continued rotation of cam 52 withdraws slide 128 and pulls gripping fingers 144 off of head 116 of the loaded bobbin. When the slide is fully retracted and roller 136 engages the dwell surface of cam 52, the bobbins held in magazine 122 fall down so that the next bobbin is positioned between fingers 144 and is ready for insertion during the next cycle of operation. During extension of the slide 128 the flat upper surface of the slide prevents the bobbins from shifting in the magazine. Following withdrawal of slide 128 the chain 14 is indexed to move the bobbin on mandrel 18 from between fingers 148.

Figure 20:
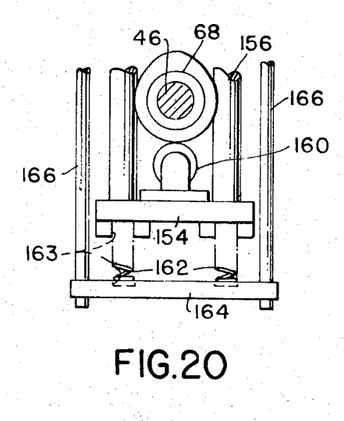
FIG. 20 is a sectional view taken along line 20—20 of FIG. 2.

Cams 68 and 70 on shaft 46 raise and lower punch assembly 150. Assembly 150 includes upper plate 152 and lower plate 154 which are secured together by four cylindrical slide posts 156. Posts 156 extend through plate 12 and are confined in bearings 158 mounted on the bottom surface of plate 12. Cam followers 160 mounted on the upper surface of plate 154 are held in engagement with cams 68 and 70 by springs 162. The springs are confined between plate 154 and fixed plates 164 and are held in position in suitable pockets 163. As shown in FIG. 20, plates 164 are secured to plate 12 by hang rods 166. The profiles of cams 68 and 70 are identical so that during each rotation of shaft 46 the cams will lower and raise assembly 150 once. Punch units 168 and 170 are held against the bottom surface of plate 152 above lug applicators 26 and 30, respectively. The operation of the punch assemblies will be explained during the description of the lug applicators.

Periodic indexing of chain 14 by drive 74 positions a bobbin 172 between fingers 174 and 176 of bobbin locator 38. Head 118 of bobbin 172 extends into grooves in the fingers 174 and 176 so that the fingers hold the bobbin for movement toward lug applicator 26. Fingers 174 and 176 form part of a reciprocal slide 178 mounted on plate 12. One end of cam bar 180 is fitted around a pin 182 in the slide. The bar is pivotally mounted to plate 12 at 184 and carries a cam follower 186 at the lower end thereof. Springs 188 bias slide 178 away from lug applicator 26 and hold the follower 186 against cam 66. Rotation of shaft 48 shifts bar 180 and extends the slide 178 to move bobbin 172 off of the mandrel and onto axially aligned square bobbin locating pin 190 carried by lug applicator 26 as illustrated in FIG. 9.

Cam 66 is provided with a broad flat lobe of 100° duration which holds bobbin 172 on pin 190 during insertion of lugs 108 into the preformed holes provided in the upper head portion 124, following which plate 152 lowers to bring punch unit 168 into engagement with the lugs to sever the inserted lugs from the lug strips and to bend down locating tabs 192 on the inserted lugs in order to secure the lugs to head portion 124.

Figure 9:
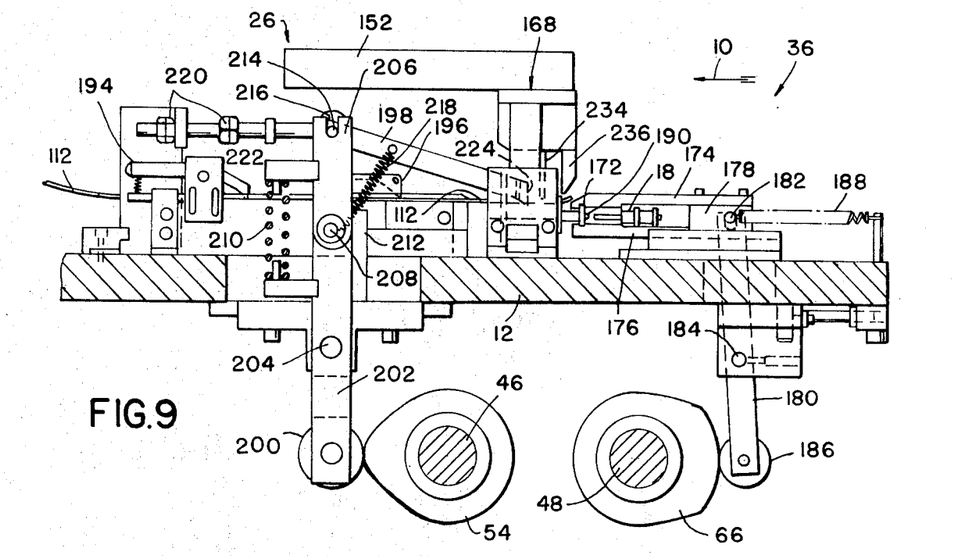
FIG. 9 is a sectional view taken along line 9—9 of FIG. 1, showing the bobbin lugging station.
Figure 10:
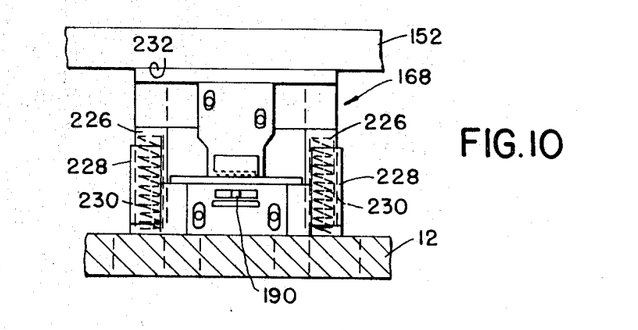
FIG. 10 is a view taken in the direction of arrow 10 in FIG. 9.
Figure 11:
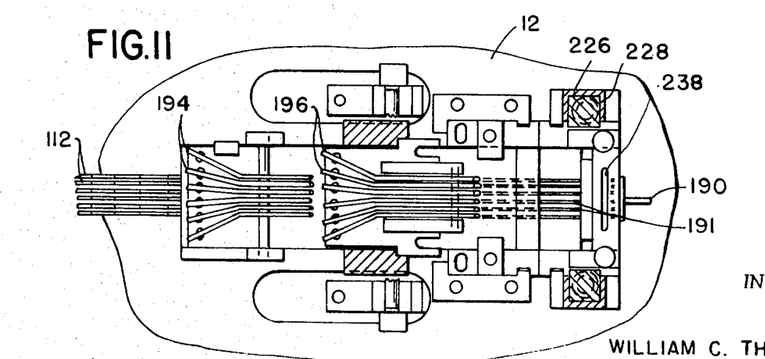
FIG. 11 is a top elevational view of the lug feed mechanism of FIG. 9.

Lug applicator 26 as shown in FIG. 9 includes a feed mechanism for feeding six lug strips 112 from supply reels to a position where the lead lugs of each strip are inserted in a bobbin. Each strip 112 is positioned in a groove 191 formed in the upper face of applicator 26 and extending from the rear of the applicator toward the chain. Conventional spring biased strip drags and backup latches 194 and 196 are provided for each strip.

The lug strips 112 are simultaneously fed along grooves 191 by the lead end of feed finger 198 in response to rotation of cam 54 on shaft 46. Cam follower 200 located at the bottom of yoke 202 engages cam 54. Yoke 202 is pivotally mounted on the bottom of plate 12 at 204. Links 206 are pivotally mounted at 208 to the upper ends of the yoke arms. Springs 210 bias links 206 in a clockwise direction as illustrated in FIG. 9 so that the links normally form extensions of yoke 202 and abut stops 212 carried by the yoke.

Pin 214 extends to either side of the trailing end of finger 198 and is fitted in slots 216 in the upper ends of the links 206. Spring 218 biases finger 198 so that the lead end thereof engages strips 112 in grooves 191. The stroke of the feed finger is determined by the setting of the stop nuts 220 on rod 222 which is also secured on pin 214.

When cam follower 200 engages the dwell surface of cam 54, yoke 202 and links 206 are rotated in a counterclockwise direction from the position of FIG. 9 and finger 198 is moved upstream relative to strips 112 so that the lead or feed end 224 thereof is withdrawn from the extended position indicated in FIG. 9 and is located behind the lateral ears of the lug immediately upstream from the lead lug in each chain 112. Rotation of shaft 46 brings follower 200 up the lobe of cam 54 to pivot yoke 202 in a clockwise direction, thereby moving finger 198 forward to insert the lead lug of each chain 112 into the openings provided on the upper head portion 124 of the bobbin mounted on locating pin 190. The stroke of the lug feed is sufficient to seat the lateral ears of each lug in recesses provided in bobbin portion 124 and to insert part of the lug through the head portion 124. The arrow in FIG. 22 indicates the direction in which the chains 112 are fed through lug applicator 26. Movement of the feed finger 198 is governed by stop nuts 220 in order to alter the stroke, depending upon the axial length of the lugs 108. Follower 200 is held against cam 54 by springs (not shown).

Punch unit 168 is secured to plate 12 by posts 226 which are slideably fitted within guides 228 to permit reciprocable movement of the unit 168 toward and away from plate 12. Springs 230 are confined between the guide 228 and posts 226 to urge the unit 168 away from plate 12. The flat top surface 232 of the punch unit engages the bottom of plate 152 so that the unit 168 is raised and lowered in response to movement of plate 152 by cams 68 and 70.

Punch unit 168 includes a lug cutoff 234 and bending punch 236. Plate 152 is lowered following insertion of lugs 108 into bobbin 172 so that cutoff 234 extends into a cutoff slot 238 in applicator 26 and severs the inserted lugs from the chains 112. Bending punch 236 is lowered on the inside of loaded bobbin head portion 224 between that portion and head 118 and bends the lug tab 192 of each inserted lug down to secure the lugs to the bobbin.

As indicated in FIG. 25, cam 66 actuates bobbin locator 38 to load bobbin 172 on pin 190 and holds the bobbin on the pin while cam 54 actuates the feed mechanism to insert the lugs into the top bobbin portion 124. Following lugging, plate 152 and punch unit 168 are lowered to sever the attached lugs from strips 112 and bend tabs 192.

Unit 168 is then raised, following which cam 66 withdraws locator 38 to reposition the partially lugged bobbin 172 on the mandrel 18. During this entire operation follower 100 engages the dwell surface of cam 72 so that chain 14 is stationary.

Figure 14:
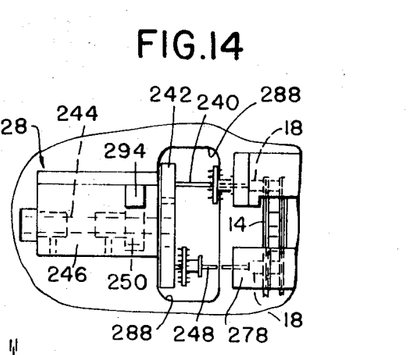
FIG. 14 is a top elevational view taken in the direction of arrow 14 in FIG. 13.

Continued indexing of the bobbin mandrel 18 with the partially lugged bobbin mounted thereon brings the bobbin into axial alignment with the square mounting pin 240 which is located on one end of plate 242 in turn station 28. Plate 242 is mounted on shaft 244 which is journaled in block 246 secured on plate 12. A second square mounting pin 248 is located at the other end of plate 242 the same distance from the axis of shaft 244 as pin 240. As indicated in FIG. 14, pins 240 and 248 are separated a distance equal to the spacing between adjacent mandrels 18 on chain 14.

Pinion 250 is mounted on shaft 244 by means of oneway clutch 252 and engages vertically reciprocable rack 254. Cam bar 256 is pivotally mounted to a fixed support at 258 and carries a cam follower 260 which is maintained in engagement with cam 64 on shaft 48. The free end of bar 256 is provided with a slot which extends around a pin mounted in the lower end of rack 254. Spring 262 biases rack 254 upwardly and maintains follower 260 in engagement with cam 64. Oneway clutch 252 permits rotation of shaft 244 as follower 260 rides up the lobe of cam 64 and rack 254 is lowered. During the rise of rack 254 to the position of FIG. 12, the clutch 252 disengages the pinion from shaft 244. The rise of cam 64 is such that during each revolution of shaft 48, plate 242 is rotated through 180°.

Figure 13:
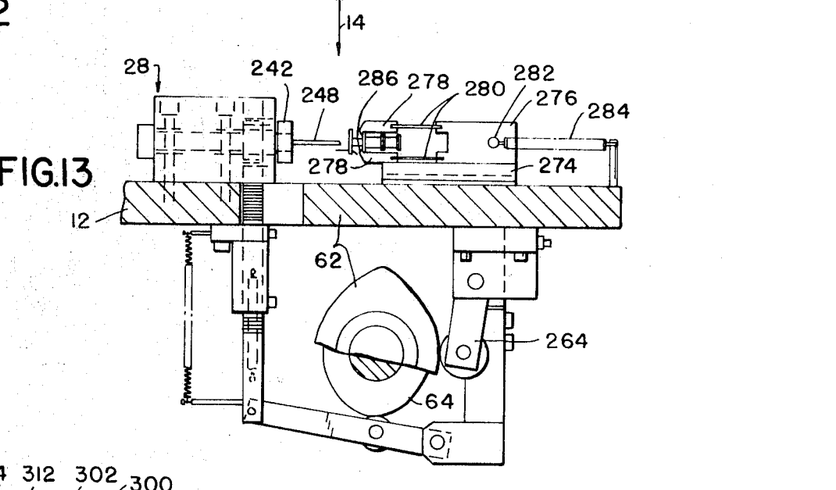

Cam bar 264 is pivotally mounted at 266 and is provided with a follower 268 which engages cam 62. Bobbin locator 40 comprises a bobbin loading slide 270 having a pair of pushing fingers 272 on the lead end thereof which extend to either side of chain 14. Slide 270 is slidably mounted on plate 274 for movement toward and away from turn station 28. Included in bobbin locator 40 is second return slide 276 which is also mounted on plate 274 for movement toward and away from station 28. Bobbin latch fingers 278 are secured to slide 276 by flexible spring portions 280. As indicated in FIG. 13, latch fingers 278 also extend to either side of chain 14. Slides 270 and 276 are spaced to either side of cam bar 264 and are joined together by pin 282. The upper end of bar 264 is provided with a slot in which pin 282 is fitted so that movement of slides 270 and 276 is controlled by cam 62. Springs 284 are mounted between pin 282 and a pin on plate 12 and bias both slides away from the turn station 28.

Figure 12:
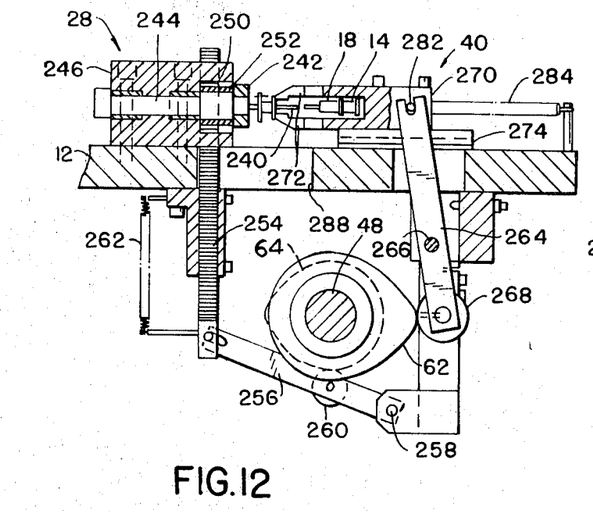
FIGS. 12 and 13 are taken along section lines 12—12 and 13—13, respectively, of FIG. 1.

Following indexing of chain 14 to bring the partially lugged bobbin into alignment with pin 240, rotation of cam 62 on shaft 48 rotates bar 264 and extends both slides 270 and 276 toward turn station 28. Fingers 272 of slide 270 engage head 118 of the bobbin on the mandrel located coaxially with pin 240 and push the bobbin from the mandrel 18 onto the pin 240 as indicated in FIG. 12. At the same time slide 276 is moved toward turn station 28 so that the beveled lead surfaces 286 of bobbin latch fingers 278 engage head 118 of the bobbin positioned on pin 248. Further movement of the slide flexes the springs 280 to permit the fingers to pass head 118 and lock the bobbin head between them.

Continued rotation of cam 62 withdraws slides 270 and 276 from turn station 28, leaving the partially lugged bobbin positioned on pin 240 as indicated in FIG. 12 and moving the bobbin on pin 248 from the pin and onto the axially aligned mandrel 18. Continued rotation of shaft 48 actuates turn station 28 by lowering rack 254, thereby rotating plate 242 through 180° so that the bobbin on pin 240 is rotated through 180° and is positioned downstream relative to chain 14 a distance equal to the distance between adjacent mandrels 18. While plate 242 is rotated, cam 72 indexes chain 14 to position the mandrel 18 which was in alignment with pin 240 prior to rotation of plate 242 in axial alignment with pin 240. A cutout 288 is provided in plate 12 to permit rotation of plate 242.

The next cycle of operation of bobbin locator 40 will remove the bobbin from pin 240 and reposition it on the same mandrel 18 it was positioned on prior to mounting on the pin. Orientation of the bobbin on the mandrel 18 is altered by turn station 28 since the bobbin has been rotated about its axis 180° and the head portion 124 which has been lugged is now located on the bottom of the bobbin and the head portion 124 which is not lugged is now on the top of the bobbin.

Continued indexing of chain 14 brings the bobbin into position between lug applicator 30 and bobbin locator 42. Applicator 30 is identical to applicator 26 and bobbin locator 42 is identical to bobbin locator 38. Punch unit 170 which is located above applicator 30 and operates in conjunction therewith is identical to punch unit 168. Cams 60 and 56 are identical respectively to cams 66 and 54 and operate bobbin locator 42 and applicator 30.

Following positioning of the bobbin between applicator 30 and locator 42, the upper portion 124 of head 116 will be lugged in the same manner as previously described so that following this cycle of operation lugs will be mounted in both bobbin head units 124. By providing station 28 which rotates the bobbin 180°, it is possible to make both applicators 26 and 30 and the associated bobbin locators 38 and 42 and punch units 168 and 170 identical. It should be noted that each of the identical units operates at the same time, thereby reducing problems of synchronization and timing.

Figures 17, 19, 22, 24:
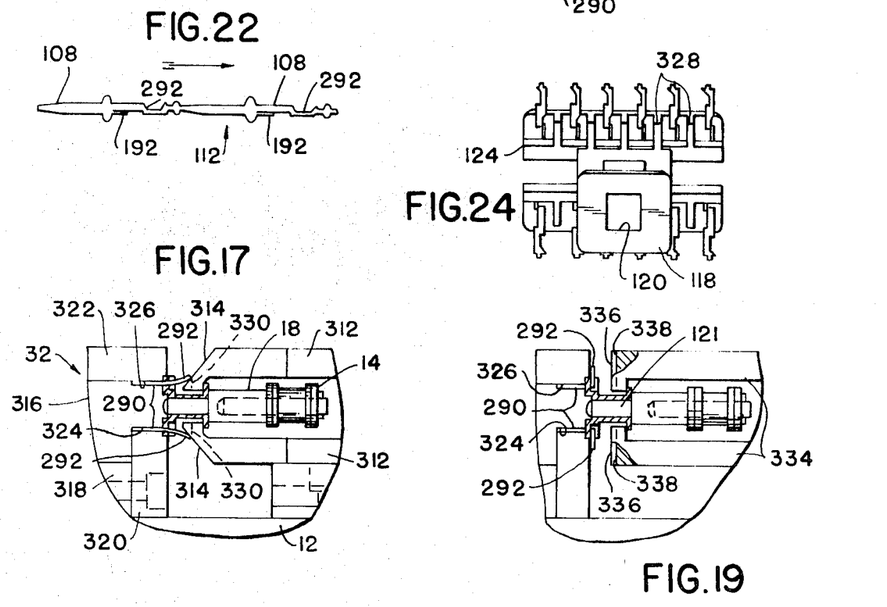
FIGS. 17, 18 and 19 illustrate the operation of the lug bending station of FIGS. 15 and 16.
FIG. 22 illustrates a portion of a continuous strip of lugs as fed to the bobbin lugger for attachment to bobbins.

Following lugging of the second bobbin head 124, twelve lugs have been inserted in the bobbin with pin portions 290 extending parallel to the axis of the bobbin from the head portions 124 and wire wrap portions 292 extending toward head 118. The wire wrap portions 292 are bent slightly away from the central portion 114 of the bobbin as indicated in FIG. 17.

Further indexing of chain 14 brings the lugged bobbin to bending station 32 which is illustrated in FIGS. 15–19. Station 32 is actuated by cam 58 on shaft 48 through cam follower 294 on cam bar 296 which is pivotally mounted on plate 12 at 298. The upper end of bar 296 is slotted and fits around pin 300 which extends through slides 302 and 304 (see FIG. 1). Cam bar 296, like previously described cam bars 132, 180, 202 and 264, extends through an opening formed in plate 12. Both slides 302 and 304 are mounted on plate 306 for movement toward and away from unit 308. Springs 310 are attached to the ends of pin 300 and are secured to plate 12 to bias the slides 302 and 304 away from unit 308.

Figure 15:
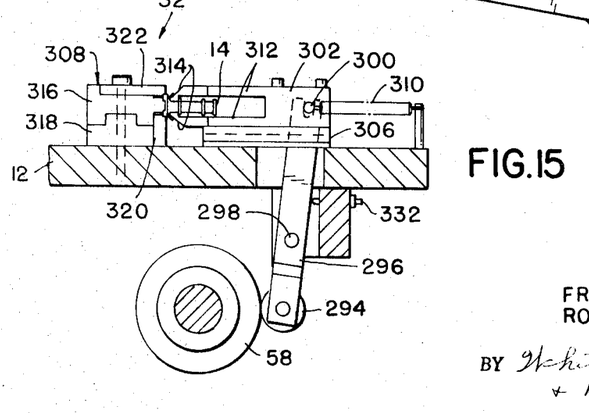
FIGS. 15 and 16 are sectional views taken along lines 15—15 and 16—16, respectively, of FIG. 1.

As shown in FIG. 15, slide 302 includes a pair of fingers 312 which extend past chain 14 and are provided with bevel work surfaces 314, at the outer ends thereof. The end portions of fingers 312 extend inwardly toward mandrel 18 so that when the lugged bobbin is indexed to a first work position adjacent bending station 32, the end portions of the fingers 312 are positioned between the bobbin heads as shown in FIG. 17 and bevel surfaces 314 are fitted underneath the lug wire wrap portions 292.

Unit 308 includes blocks 316 and 318 and plates 320 and 322 which are secured together and are bolted to plate 12. Grooves 324 and 326 for receiving end portions 290 of the lugs of each bobbin are provided at the interfaces between block 316 and plates 320 and 322, and extend longitudinally parallel to chain 14 the length of unit 308. The pin portions 290 have a neat sliding fit in grooves 324 and 326. A slight lead-in may be provided at the upstream end of the grooves to facilitate feeding of the pin portions into the grooves as the bobbin is moved to bending station 32.

Indexing of the chain 14 by sprocket 17 positions a lugged bobbin between fingers 312 of slide 302 with the lug pin portions held in grooves 324 and 326. Rotation of cam 58 moves slide 302 from the rest or dwell position of FIG. 17 toward unit 308 to a position shown in FIG. 18 where the bevel work surfaces 314 have bent wire wrap portions 292 of each lug through an acute angle of approximately 45° relative to the pin portions 290. The bobbin head portions 124 may include walls 328 between adjacent wire wrap portions 292. In this case it is necessary to provide recesses 330 at the ends of the fingers adjacent the walls 328 to permit the fingers to be moved into contact with head portions 124 to assure that the lugs 108 are bent adjacent the bobbin head.

Figure 18:
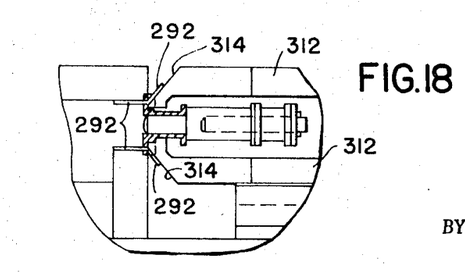

Following bending of the wire wrap portions 292 through an approximately 45° angle relative to the confined pin portions 290, further rotation of cam 58 returns slide 302 to the position of FIG. 15. An adjustable stop 332 is provided to limit return movement of cam bar 292, thereby assuring that the end portions of fingers 312 do not bind on bobbin head 118.

Following return of slide 302 to the rest position, chain 14 is indexed so that the bobbin moves from slide 302 to slide 304. This slide includes a pair of bending fingers 334 which extend around chain 14 and are provided with end portions extending into the space between the bobbin heads. Fingers 334 are provided with flat work faces 336 at the ends thereof which lie in a plane perpendicular to the axis of the bobbin. During movement of the bobbin from slide 302 to slide 304, lug pin portions 290 slide along grooves 324 and 326 and the bobbin is moved laterally by chain 14 to a position between fingers 334. The work faces 336 are recessed at 338 opposite bobbin head walls 328. Movement of slide 304 toward unit 308 brings the work surfaces 336 into engagement with the partially bent wire wrap lug portions 292 so that with further movement of the slide toward the bending station these lug portions are bent to a position at right angles relative to the held pin portions 290. At the end of the forward stroke of slide 304 the work surfaces 336 form a sharp 90° bend in the lugs 108 adjacent the bobbin portions 124 so that lug wire wrap portions 292 are straight and extend laterally outwardly from bobbin portions 124 in a plane perpendicular to the bobbin axis. Grooves 324 and 326 confine lug pin portions 290 during the progressive bending of the wire wrap portions to assure that the pin portions are straight and extend from the bobbin portions 124 parallel to the axis of the bobbin.

Following the bending of the wire wrap portions 292, slide 304 is retracted. Further indexing of chain 14 moves the bobbin away from bending station 32 until the bobbin is moved into engagement with ejector 34. The ejector 34 comprises a thin cam plate 340 which, as shown in FIG. 1, engages bobbin head 116 so that with further movement of chain 14 the lugged bobbin is cammed off of mandrel 18.

OPERATION OF BOBBIN LUGGER

The operation of the bobbin lugger 10 is continuous and bobbins are lugged as long as a supply is maintained in magazine 122. During operation of the lugger, bobbins are moved along the path of chain 14 from the magazine 122 to the ejector 34. Bobbins are positioned on all the mandrels 18 between the loader 24 and ejector during indexing of the chain with the exception of the mandrel opposite the upstream mounting pin of the turn station 28. Thus with every revolution of shafts 46 and 48, the bobbin loader 24, lug applicator 26, turn station 28, lug applicator 30, and bending station 32 perform their intended functions on a bobbin. In the case of the turn station 28, one bobbin is at all times positioned on a mounting pin so that with rotation of plate 242 a single bobbin is rotated through 180° and translated a distance in the direction of movement of chain 14 equal to the spacing between adjacent mandrels 18 thereon. The operation of the bobbin lugger 10 will now be described in detail by following the path of a single bobbin through the machine.

The operation of the apparatus is best understood by referring to FIG. 1 and to FIG. 25 which is a chart showing the timing of the operation of the various elements of the lugger. The X-axis of chart 25 represents the angular position of the shafts 46 and 48 for one complete revolution. The timing and extent of the movement of the cam follower associated with each cam are indicated on the Y-axis. Thus it is apparent that during the 180° to 360° period of each cycle the chain 14 is indexed forward by cam 72 to move each mandrel 18 forward one position, and plate 242 is rotated through 180°. The rest of the cams do not operate their respective elements during this period.

During the period from 0° to 180° of each cycle of operation a bobbin is loaded onto a mandrel 18 by cam 52. Cams 60 and 66 load bobbins on lug applicators 26 and 30, the applicators are actuated through cams 54 and 56 to apply lugs to the loaded bobbins, and punch units 168 and 170 are lowered by cams 68 and 70 to sever and secure the lugs to the bobbins, and the wire wrap portions of lugs attached to bobbins are accurately bent through 90° by actuation of lug bending station 32 by cam 58.

A bobbin is loaded onto an empty mandrel 18 by loader 24 during the 4° to 94° interval of each cycle of operation. During the period from 94° to 184° the loader is retracted and bobbin locator 36 secures the bobbin on the mandrel 18. From 192° to 282° of this cycle, chain 14 is indexed to the left a distance equal to the spacing between adjacent mandrel holders, and the bobbin is moved laterally from between the jaws of holder 36. During the period from 0° to 53° of the next cycle of operation, cam 76 extends the indexing finger 78 between adjacent lengths of chain 14 to pilot the chain to assure that the mandrels 18 are properly located. This operation occurs during each cycle of the lugger.

Two more complete cycles of operation bring the bobbin to a position between the fingers of bobbin locator 38 and into axial alignment with pin 190 of lug applicator 26. During the period from 4° to 40° of the next following cycle of operation, cam 66 actuates bobbin locator 38 to move the bobbin from the mandrel 18 onto accurately locating pin 190 of lug applicator 26 and holds the bobbin on the pin during the period from 40° to 140°. Lug chains 112 are fed toward the bobbin by operation of cam 54 during the period from 0° to 82°. The lugs are not inserted into the upper head portion 124 of the bobbin until the bobbin is fully positioned on pin 190 since they must be fed axially a distance equal to the length of lug portion 290 before they project outwardly of applicator 26 and into the recesses provided in the bobbin. Thus feeding of the lead lugs into the bobbin occurs after the cycle has proceeded through 40° and the bobbin is fully seated on the pin 190.

During the 4° to 94° interval of this cycle, cams 68 and 70 lower plate 152 to bring punch unit 168 down to sever the lugs following their insertion into the bobbin. The lugs are fully inserted in the bobbin at 82° and the punch unit bottoms at 94°. Punching and bending of the inserted lugs occurs after 82° and accordingly after the lugs are fully inserted. The punch unit 168 is raised out of engagement with the lug applicator 26 and the lugged bobbin prior to the 140° to 176° interval when cam 66 returns the bobbin to the mandrel 18. During the last half of this cycle, the bobbin is moved from bobbin locator 38.

Continued cycling of the lugger moves the mandrel and bobbin thereon out from between the fingers of bobbin locator 38 to a position in front of the fingers of slide 270 of bobbin locator 40 and in axial alignment with one of the pins 240, 248 of turn station 28. During the 4° to 86° interval of the next subsequent cycle of operation, cam 62 extends slide 270 and pushes the bobbin from mandrel 18 onto the adjacent turn station pin. The slide 270 is retracted during the interval between 86° to 168°. The turn station 28 is actuated by cam 64 during 172° to 262° to rotate plate 242 through 180°, thus bringing the bobbin on the turn station pin in axial alignment with its vacant mandrel 18 which has been indexed forward one position by cam 72 during the interval from 192° to 282°. Operation of the turn station rotates the bobbin about its axis 180° so that the lugged head portion 124 is now on the bottom of the bobbin and the head portion 124 free of lugs is on the top of the mandrel in position for receiving lugs from lug applicator 30.

During the next cycle of operation of the bobbin lugger, the cam 62 move slide 276 toward the bobbin on the turn station pin during the 4° to 86° interval and snaps latch fingers 278 over bobbin head 118. From 86° to 168° the slide is retracted and the bobbin, now rotated 180° about its axis, is repositioned on its mandrel 18. During the second half of the cycle the bobbin and mandrel are indexed laterally through operation of cam 72.

Another cycle of operation brings the bobbin in position between the fingers of bobbin locator 42 and in axial alignment with the locating pin of lug applicator 30. During the subsequent cycle of operation the bobbin locator 42, applicator 30, and punch unit 170 are operated in exactly the same sequence as previously described to apply lugs on the upper head portion 124. During the last part of this cycle of operation the bobbin is indexed laterally past locator 42. Two more cycles of operation bring the bobbin between the fingers of slide 302 of bend unit 32 and position the pin ends of the lugs carried by the bobbin in the slots provided in unit 308.

During the interval from 62° to 86° of the next cycle of operation, cam 58 moves the fingers of slide 302 into engagement with the wire wrap portions of the lugs to bend the same through approximately 45° relative to the confined pin portions. The slide is retracted during the 86° to 110° interval of this cycle. In the last half of the cycle the bobbin and mandrel are indexed from between the fingers of slide 302 to a position between the fingers of slide 304.

The following cycle moves slide 302 into engagement with the partially bent wire wrap portions of the lugs to bend the same to a 90° position relative to the held pin portions. The slide is moved into engagement with the lugs and away therefrom by cam 58. In the second half of this cycle the bobbin is indexed away from station 32 by movement of chain 14. Subsequent movement of the chain brings the bobbin into engagement with cam plate 340 which removes the lugged bobbin from mandrel 18.

Suitable automatic controls may be provided for the bobbin lugger to shut down the lugger in case of malfunction, jamming, lack of bobbins in magazine supply 122, or a failure in one of the lug strips 112. It is desirable to provide an automatic bobbin loading mechanism to assure that the magazine supply 122 is provided with bobbins at all times. These systems do not form any part of the invention described herein.

The two-step bending of the wire lug wrap portions 292 is an important feature of the invention. It is essential that these portions be bent outwardly very accurately so that they project away from the bobbin at a 90° angle to the lug pin portions 108 to facilitate wrapping of wire leads around the wire wrap portions by automatic machines. While it is possible to bend the wire wrap portions through 90° in a single step, such a bending operation does not form the sharp 90° bend achieved by the two step bending. Bending the wire wrap portions in one step would bend the portions 292 slightly along their entire length so that they would not be accurately located in a plane perpendicular to the bobbin axis. Such lugs cannot be reliably wire wrapped by automatic machines.

While the bobbin lugger 10 described herein utilizes a chain drive for periodically indexing the bobbin along a linear path past a plurality of work stations, it is not intended that the invention be limited to a bobbin lugger utilizing a chain or linear bobbin feed. Obviously, the lugger could use a rotary table for indexing a bobbin held in a mandrel on the circumference of a table past a plurality of fixed work stations adjacent the work table. Other forms of drives may be utilized for indexing the bobbin along a path past the work stations. In some bobbin luggers the bobbin need not be removed from the indexing mandrel during the attachment of lugs, although in the bobbin lugger here described it is preferable to remove the bobbin from the indexing mandrel and mount it on the locating pin associated with the lug applicator prior to attaching lugs to it. Different types of lug applicators may be utilized and in some cases it is contemplated that a lug applicator may be provided for attaching each lug individually to the bobbin. In this way it is possible to increase the flexibility of the bobbin lugger since each applicator can be individually positioned to insert the lug at a desired location in the bobbin.

It is not necessary to the practice of the invention that both bobbin luggers be identical although this feature has a number of advantages in the disclosed lugger 10. The lugger could utilize a first lug applicator where lugs are secured to a first portion of a bobbin, a turn station which rotates the bobbin to position a second portion of the bobbin for receiving lugs, and a second lug applicator different than the first applicator for attaching lugs to the second portion.

While we have illustrated and described a preferred embodiment of our invention, it is understood that this is capable of modification and we therefore do not wish to be limited to the precise details set forth but desire to avail ourselves of such changes and alterations as fall within the purview of the following claims.

What we claim as our invention is:

1. An assembly apparatus for mounting electrical contacts on a workpiece comprising first and second mounting means spaced apart and located adjacent a work path, each such means being operable to attach a contact in a predetermined location on a workpiece when the workpiece is presented thereto, holding means for maintaining a workpiece in fixed orientation, drive means for moving said holding means along said path to successively present said workpiece to said first and second mounting means, and workpiece orienting means for disassociating the workpiece from said holding means, altering the orientation of the workpiece, and reassociating the workpiece with said holding means in a second orientation after a contact has been attached thereto by said first mounting means and prior to attachment of a second contact thereon by said second mounting means.

2. An assembly apparatus as in claim 1 wherein said workpiece orienting means includes means for rotating said workpiece about an axis to change the angular orientation thereof relative to said holding means.

3. An assembly apparatus as in claim 2 wherein said orienting means includes means for moving the workpiece along said path.

4. An assembly apparatus as in claim 1 wherein said holdinb means includes a mandrel adapted to fit in an interior opening of said workpiece and said orienting means is located between said first and second mounting means adjacent said path and rotates the workpiece through an angle relative to the axis of the mandrel so that said first and second mounting means attach contacts at different angular locations on the workpiece.

5. An assembly apparatus as in claim 4 wherein said axis of the mandrel is oriented perpendicular to said path.

6. An assembly apparatus as in claim 4 wherein said angle is 180°.

7. An assembly apparatus as in claim 4 including means located adjacent said path upstream of said first mounting means for automatically loading the workpiece on said mandrel, and ejecting means located adjacent said path downstream from said second mounting means for removing said workpiece from said mandrel.

8. An assembly apparatus as in claim 4 including contact bending means located adjacent said path downstream of said second mounting means, said bending means including first and second bending stations for progressively bending a portion of at least one contact on said workpiece through 90° relative to the remainder of such contact, said first bending station being operable to bend said portion through approximately 45° and said second bending station being operable to bend said portion through the remaining 45° whereby a sharp 90° bend of such contact is achieved.

9. An assembly apparatus as in claim 8 wherein said bending means includes means for holding said remainder fixed during bending of said portion and wherein said first bending station includes a tool movable toward said portion for engagement therewith and having a work face oriented at an angle of approximately 45° relative to said remainder and said second bending station includes a tool movable toward said portion and having a work face oriented at an angle of 90° relative to said remainder whereby upon movement of said first station tool toward said portion such portion is bent through an angle of approximately 45° and upon movement of said second station tool such portions is bent to a sharp angle of 90° relative to said remainder.

10. An automatic bobbin lugger comprising a base, first and second lug applicators mounted on said base adjacent a work path, each applicator adaptable to apply a lug to a bobbin, indexing means on said base for moving bobbins along said path past said first and second applicators, said indexing means including a support extending along said path, a plurality of bobbin holders mounted on said support in spaced relation along said path, and drive means for indexing said support along said path, each bobbin holder being adapted to receive a bobbin in a first position when upstream of said first lug applicator, bobbin orienting means on said base adjacent said path between said first and second lug applicators for removing a bobbin held by one of said holders when such holder is adjacent said orienting means, changing the orientation of the bobbin from said first position to a second position, repositioning the bobbin on such holder in said second position, and actuation means for driving said lug applicators and said bobbin orienting means when said drive means positions bobbin holders adjacent thereto whereby bobbins are moved along said path and said first lug applicator applies a lug to each bobbin in a first location thereon and said second lug applicator applies a lug to each bobbin in a second location thereon.

11. An automatic bobbin lugger as in claim 10 wherein each of said lug applicators includes bobbin positioning means, means for mounting a lug on a bobbin when said bobbin is mounted on said bobbin positioning means, and transfer means for moving said bobbin from a bobbin holder to said positioning means and for returning said bobbin to such bobbin holder.

12. An automatic bobbin lugger as in claim 10 wherein said bobbin orienting means includes means for rotating said bobbin to a second position when free from such bobbin holder.

13. An automatic bobbin lugger as in claim 12 wherein said orienting means includes means for shifting said bobbin downstream along said path while rotating said bobbin to said second position, and said drive means moves such bobbin holder downstream while said bobbin is rotated.

14. An automatic bobbin lugger as in claim 12 wherein said support comprises a continuous chain, said bobbin holders comprise mandrels mounted on said chain at regular intervals therealong, said mandrels being adapted to fit within interior bores of said bobbins, the spacing between said first lug applicator, said bobbin orienting means, and said second applicator being an integral number of times the spacing between adjacent bobbin holders on said chain, said drive means being operable to index said chain intermittently a distance along said path to position each mandrel in the position of the adjacent downstream mandrel prior to indexing whereby each indexing of said chain by said drive means positions a mandrel adjacent each of said first lug applicator, said orienting means, and said second lug applicator.

15. An automatic bobbin lugger as in claim 14 wherein said chain is positioned on a plurality of sprockets, a first sprocket being located upstream of said first lug applicator and a second sprocket being located downstream of said second lug applicator, said chain extends linearly between said first and second sprockets whereby said path is a straight line, said drive means being operable to rotate one of said sprockets to index said chain along said path.

16. An automatic bobbin lugger as in claim 11 wherein said positioning means comprise fixed mandrels adaptable to fit within interior cavities of said bobbins and to prevent alteration of the position of said bobbins when mounted thereon.

17. An automatic bobbin lugger as in claim 12 wherein said first and second lug applicators each apply a lug to a bobbin in the same location relative to the adjacent bobbin holder.

18. An automatic bobbin lugger as in claim 17 wherein said first and second lug applicators are identical and wherein said actuation means drives said lug applicators to apply lugs to bobbins at the same time.

19. An automatic bobbin lugger as in claim 14 including bobbin mounting means on said base located adjacent said path and upstream from said first lug applicator for mounting a bobbin on one of said holders in said first position when said holder is adjacent said mounting means.

20. An automatic bobbin lugger as in claim 12 including lug bending means on said base adjacent said path downstream of said second lug applicator for progressively bending a portion of a lug mounted on a bobbin through a sharp 90° bend relative to the remainder of such lug.

21. An automatic bobbin lugger as in claim 20 wherein said lug bending means include first bending means for bending said portion through an angle of approximately 45° relative to said remainder, and second bending means for bending said portion through the remainder of the 90° angle relative to said remainder.

22. Apparatus for forming an electrical contact including means for moving such contact along a work path, a first bending station on said path adapted to bend a portion of such contact through an angle relative to the remainder of said contact, and a second bending station on said path downstream of said first bending station for bending such portion through a second angle relative to such remainder such that said portion forms a sharp angle with said remainder, said first and second angles being approximately equal.

23. Apparatus for forming an electrical contact as in claim 22 wherein said angles are approximately 45°.

24. Apparatus for forming an electrical contact as in claim 22 including means for holding said remainder fixed during bending of said portion.

25. A method of mounting electrical contacts on a workpiece including the steps of positioning said workpiece on a work path in a first orientation, moving the workpiece along said path while in said first orientation to a first station, applying an electrical contact to said workpiece while at said first station and maintained in said first orientation, moving said workpiece further along said path while in said first orientation to a second station, positioning said workpiece in a second orientation while at said second station, moving said workpiece along said path while in said second orientation to a third station, and applying a second electrical contact to said workpiece in a position different than the position of the first electrical contact while at said third station.

26. A method as in claim 25 wherein prior to applying electrical contacts at said first and third stations, said workpiece is moved laterally away from said path for engagement with contact applicators.

27. A method as in claim 26 including the step of rotating said workpiece to change its position from said first orientation to said second orientation.

28. A method of applying lugs to a bobbin comprising positioning a bobbin on a path in a first orientation, indexing the bobbin along said path to a position adjacent a first lug applicator, moving said bobbin from said path toward said first lug applicator to locate said bobbin relative thereto while in said first orientation and then applying a first lug to said bobbin, repositioning said bobbin on said path, indexing said bobbin along said path to a turn station, moving said bobbin from the path and rotating the bobbin to a second orientation and then repositioning the bobbin in said second orientation on the path, indexing the bobbin along said path to a position adjacent a second lug applicator, moving said bobbin from said path toward said second applicator to locate the bobbin relative thereto while in said second orientation, and then applying a second lug to said bobbin in a location different than that of the first lug.

References Cited

UNITED STATES PATENTS

| | | | |
|---|---|---|---|
| 2,515,881 | 7/1950 | Makenny | 29—203 |
| 3,432,925 | 3/1969 | Woolley | 29—630 |

THOMAS H. EAGER, Primary Examiner

U.S. Cl. X.R.

29—203